(12) United States Patent
Dommsch

(10) Patent No.: US 9,796,449 B2
(45) Date of Patent: Oct. 24, 2017

(54) VEHICLE OPERABLE BY MOTOR POWER AND BY MUSCULAR POWER

(71) Applicant: Robert Bosch GmbH, Stuttgart (DE)

(72) Inventor: Hans-Peter Dommsch, Lichtenau (DE)

(73) Assignee: ROBERT BOSCH GMBH, Stuttgart (DE)

(*) Notice: Subject to any disclaimer, the term of this patent is extended or adjusted under 35 U.S.C. 154(b) by 2 days.

(21) Appl. No.: 14/784,549

(22) PCT Filed: Mar. 3, 2014

(86) PCT No.: PCT/EP2014/054027
§ 371 (c)(1),
(2) Date: Oct. 14, 2015

(87) PCT Pub. No.: WO2014/170061
PCT Pub. Date: Oct. 23, 2014

(65) Prior Publication Data
US 2016/0052595 A1    Feb. 25, 2016

(30) Foreign Application Priority Data

Apr. 15, 2013   (DE) .................. 10 2013 206 713

(51) Int. Cl.
*B62M 6/55* (2010.01)
*B62M 6/70* (2010.01)
(Continued)

(52) U.S. Cl.
CPC ............... *B62M 6/70* (2013.01); *B62M 6/45* (2013.01); *B62M 6/55* (2013.01); *B62M 9/06* (2013.01)

(58) Field of Classification Search
CPC ............................................. B62M 6/40–6/75
(Continued)

(56) References Cited

U.S. PATENT DOCUMENTS

| 4,665,773 A * | 5/1987 | Hiramatsu ............ B60W 10/02 477/39 |
| 5,121,936 A * | 6/1992 | Cowan ................. B62M 11/145 280/236 |

(Continued)

FOREIGN PATENT DOCUMENTS

| CN | WO 2010022578 A1 * | 3/2010 | ............. B62M 6/50 |
| DE | 2218730 | 11/1973 | |
| JP | H11240481 | 9/1999 | |

OTHER PUBLICATIONS

International Search Report for PCT/EP2014/054027, dated Jul. 4, 2014.

*Primary Examiner* — Joseph M Rocca
*Assistant Examiner* — Conan D Duda
(74) *Attorney, Agent, or Firm* — Norton Rose Fulbright US LLP; Gerard Messina

(57) ABSTRACT

A vehicle that is operable by motor power and/or by muscular power, in particular an electric bicycle, including a crankshaft drive having a bottom bracket bearing shaft, a front sprocket that transmits a drive torque for the vehicle to a chain, an electric drive and a friction gear for continuously varying a transmission ratio, the friction gear and the electric drive being configured on the crankshaft drive, and the friction gear being coupled to the crankshaft drive and adapted for transmitting a rider-produced torque to the front sprocket.

18 Claims, 4 Drawing Sheets

(51) Int. Cl.
*B62M 6/45* (2010.01)
*B62M 9/06* (2006.01)

(58) Field of Classification Search
USPC .................................................... 180/206.4
See application file for complete search history.

(56) References Cited

U.S. PATENT DOCUMENTS

| | | | | |
|---|---|---|---|---|
| 6,053,833 A * | 4/2000 | Masaki | ................. | B60K 6/445 |
| | | | | 475/2 |
| 6,497,634 B1 * | 12/2002 | Bode | ................. | F16H 3/42 |
| | | | | 474/139 |
| 6,672,418 B1 * | 1/2004 | Makino | ................. | B62M 6/45 |
| | | | | 180/206.3 |
| RE38,887 E * | 11/2005 | Bode | ................. | F16H 3/42 |
| | | | | 474/139 |
| 8,905,895 B2 * | 12/2014 | Scalf | ................. | 475/343 |
| 8,965,610 B2 * | 2/2015 | Boyle | ................. | B62M 6/50 |
| | | | | 180/206.1 |
| 9,221,516 B1 * | 12/2015 | Song | ................. | B62M 6/65 |
| 2002/0014366 A1 * | 2/2002 | Turner | ................. | B62M 6/45 |
| | | | | 180/220 |
| 2002/0173397 A1 * | 11/2002 | Wu | ................. | B62M 6/45 |
| | | | | 475/2 |
| 2004/0224811 A1 * | 11/2004 | Vornehm | ................. | B60K 6/48 |
| | | | | 475/207 |
| 2004/0226083 A1 * | 11/2004 | Wilson | ................. | E03D 5/10 |
| | | | | 4/249 |
| 2005/0233846 A1 * | 10/2005 | Green | ................. | F16H 55/54 |
| | | | | 474/47 |
| 2007/0060440 A1 * | 3/2007 | Lee | ................. | B62M 6/40 |
| | | | | 475/337 |
| 2007/0187952 A1 * | 8/2007 | Perlo | ................. | B60L 8/00 |
| | | | | 290/1 R |
| 2007/0238568 A1 * | 10/2007 | Lahr | ................. | F16H 29/04 |
| | | | | 475/207 |
| 2007/0252452 A1 * | 11/2007 | Ishimoto | ................. | B62J 6/12 |
| | | | | 310/67 A |
| 2008/0207379 A1 * | 8/2008 | Kim | ................. | B62M 11/14 |
| | | | | 475/211 |
| 2009/0095552 A1 * | 4/2009 | Gulas | ................. | B62M 6/45 |
| | | | | 180/206.5 |
| 2009/0248264 A1 * | 10/2009 | Kubo | ................. | F16D 48/066 |
| | | | | 701/58 |
| 2009/0305831 A1 * | 12/2009 | Moeller | ................. | B62M 6/65 |
| | | | | 475/5 |
| 2010/0116066 A1 * | 5/2010 | Mizuno | ................. | G01L 5/13 |
| | | | | 73/862.69 |
| 2010/0131164 A1 * | 5/2010 | Carter | ................. | B60L 11/1805 |
| | | | | 701/61 |
| 2010/0267510 A1 * | 10/2010 | Nichols | ................. | B62M 11/16 |
| | | | | 475/189 |
| 2010/0304915 A1 * | 12/2010 | Lahr | ................. | F16H 29/04 |
| | | | | 475/207 |
| 2011/0183793 A1 * | 7/2011 | Chan | ................. | B62M 6/55 |
| | | | | 474/69 |
| 2011/0183794 A1 * | 7/2011 | Chan | ................. | B62M 6/55 |
| | | | | 474/70 |
| 2011/0183805 A1 * | 7/2011 | Chan | ................. | B62M 6/50 |
| | | | | 475/254 |
| 2012/0012412 A1 * | 1/2012 | Moeller | ................. | B62M 6/45 |
| | | | | 180/206.2 |
| 2012/0312618 A1 * | 12/2012 | Chan | ................. | B62M 6/55 |
| | | | | 180/206.4 |
| 2013/0095971 A1 * | 4/2013 | Hino | ................. | B62M 11/04 |
| | | | | 475/5 |
| 2013/0303322 A1 * | 11/2013 | Kennedy | ................. | F16H 3/725 |
| | | | | 475/149 |
| 2013/0337957 A1 * | 12/2013 | Vranish | ................. | F16H 3/76 |
| | | | | 475/149 |
| 2013/0337958 A1 * | 12/2013 | Scalf | ................. | H02K 11/24 |
| | | | | 475/149 |
| 2014/0353055 A1 * | 12/2014 | Kronfeld | ................. | B62M 6/40 |
| | | | | 180/65.31 |
| 2015/0008059 A1 * | 1/2015 | Douglas | ................. | B62K 25/32 |
| | | | | 180/206.1 |
| 2015/0122565 A1 * | 5/2015 | Deleval | ................. | B62M 6/55 |
| | | | | 180/206.3 |
| 2015/0214813 A1 * | 7/2015 | Timonen | ................. | B62M 6/55 |
| | | | | 310/67 R |
| 2015/0291256 A1 * | 10/2015 | Taitt | ................. | B62M 6/65 |
| | | | | 475/2 |
| 2016/0039496 A1 * | 2/2016 | Hancock | ................. | G01S 19/19 |
| | | | | 701/60 |
| 2016/0040763 A1 * | 2/2016 | Nichols | ................. | B62M 6/55 |
| | | | | 475/189 |
| 2016/0061293 A1 * | 3/2016 | Hwang | ................. | F16H 3/006 |
| | | | | 477/36 |
| 2016/0068222 A1 * | 3/2016 | Ichida | ................. | B62M 6/45 |
| | | | | 477/15 |
| 2016/0107720 A1 * | 4/2016 | Xu | ................. | B62M 6/50 |
| | | | | 475/4 |
| 2016/0221635 A1 * | 8/2016 | Kuehlcke | ................. | B62M 6/55 |

* cited by examiner

VEHICLE OPERABLE BY MOTOR POWER AND BY MUSCULAR POWER

BACKGROUND INFORMATION

The present invention relates to a vehicle that is operable by motor power and/or by muscular power, in particular an electric bicycle, having a friction gear.

Electric bicycles of various designs are known from the related art, for example. There are electric bicycles where the electric drive is configured in the area of the bottom bracket bearing (mid-engine design). A rear wheel is then driven by a chain. In this case, a gearshift device, for example, a derailleur or hub gear or the like may be configured on the rear wheel. Other alternative configurations, specifically of gearshift devices, would be desirable here.

SUMMARY OF THE INVENTION

The vehicle that is operable by motor power and/or by muscular power in accordance with the present invention, in particular an electric bicycle having the features of claim 1, has the advantage of permitting an especially compact design of an electric drive and of a gearshift device. One particular advantage is that the gearshift device makes it possible for a transmission to be continuously varied. In this case, an especially compact design is made possible by the present invention. In addition, a continuous variation of a transmission may allow an especially effective interplay between a pedal drive and an electric drive, making the present invention especially suited for an electric bicycle. The transmission may be readily varied even under load and, in particular, noise may even be avoided in the case of a change in the transmission ratio, so that varying the transmission ratio in accordance with the present invention is a very noiseless process. This is achieved in accordance with the present invention in that the vehicle features a crankshaft drive having a bottom bracket bearing shaft, a front sprocket, and an electric drive. Moreover, the vehicle includes a continuously variable friction gear for continuously varying the transmission ratio. The friction gear is thereby configured on the crankshaft drive, is coupled thereto, and is adapted for transmitting a rider-produced torque to the front sprocket. With regard to the continuously variable friction gear, it is also advantageous that a gear shifting under load is possible, and that a rider does not notice any sudden transmission changes. An especially advantageous driving feel results herefrom, in particular in combination with the electric drive, since the torque thereof and the speed are likewise steplessly controllable.

Preferred embodiments of the present invention are recited in the dependent claims.

To achieve an especially compact design, the friction gear is preferably configured within a housing of the crankshaft drive.

The friction gear is preferably a traction mechanism drive, in particular a CVT transmission having a traction mechanism and two V-pulleys.

It is also preferred that the vehicle have a first planetary gear via which the electric drive is connected to the front sprocket, thereby driving the same. A bushing or the like, for example, may provide a coupling between the planetary gear and the front sprocket. The bushing is preferably mounted via a freewheel on the bottom bracket bearing shaft.

The electric drive preferably drives the front sprocket via the friction gear. Here, the advantage is derived that the friction gear makes possible a continuously variable transmission, so that, depending on the control of the electric drive, an optimal transmission ratio may be rendered possible by the friction gear.

It is also preferred that the friction gear be coupled via the first planetary gear to the front sprocket. At the same time, it is especially preferred that a planetary gear be configured between the electric drive and the friction gear.

A ring gear of the planetary gear preferably features an external toothing via which the planetary gear is driven by the output of the electric drive.

In accordance with another preferred embodiment of the present invention, a rider-operated actuator may vary a transmission of the friction gear. If the friction gear is a CVT transmission, a control motor is preferably used to adjust one of the two V-pulleys.

An especially compact design is obtained when the bottom bracket bearing shaft extends through a component of the friction gear, in particular through one of the V-pulleys of the CVT transmission.

It is also preferred that the vehicle have a second planetary gear, the second planetary gear being configured between the bottom bracket bearing shaft and the friction gear. This permits an even better adaptation and transmission of the rider-applied torque.

The vehicle also preferably includes a control unit and a force sensor for recording a rider-applied force. This makes it possible to determine a force value, the control unit being adapted for controlling the electric drive of the vehicle on the basis of the recorded force value. Additionally or alternatively, a rider-applied torque may also be used for controlling the electric drive. The force sensor is preferably configured on the ring gear of the second planetary gear. This allows the force sensor to be readily integrated in the motor gear assembly.

Another preferred embodiment of the present invention provides that the friction gear be mounted above the bottom bracket bearing shaft. It is also preferred that the electric motor be mounted below the bottom bracket bearing shaft.

It is especially preferred that the vehicle according to the present invention be an electric bicycle, making it possible to eliminate a gearshift device on a rear wheel of the electric bicycle by using the continuously variable friction gear in accordance with the present invention. By configuring both the electric drive, as well as the gearshift device in the form of the friction gear on the bottom bracket bearing, an especially low center of gravity of the electric bicycle is also thereby made possible, thereby positively influencing the handling properties of the electric bicycle.

DRAWING

Preferred exemplary embodiments of the present invention are described in detail in the following with reference to the accompanying drawing. Like or functionally equivalent parts are denoted by the same reference numerals in the exemplary embodiments. In the drawing.

DETAILED DESCRIPTION

An electric bicycle 1 in accordance with a first preferred exemplary embodiment of the present invention is described in detail in the following with reference to FIGS. 1 and 2.

Figure 1:
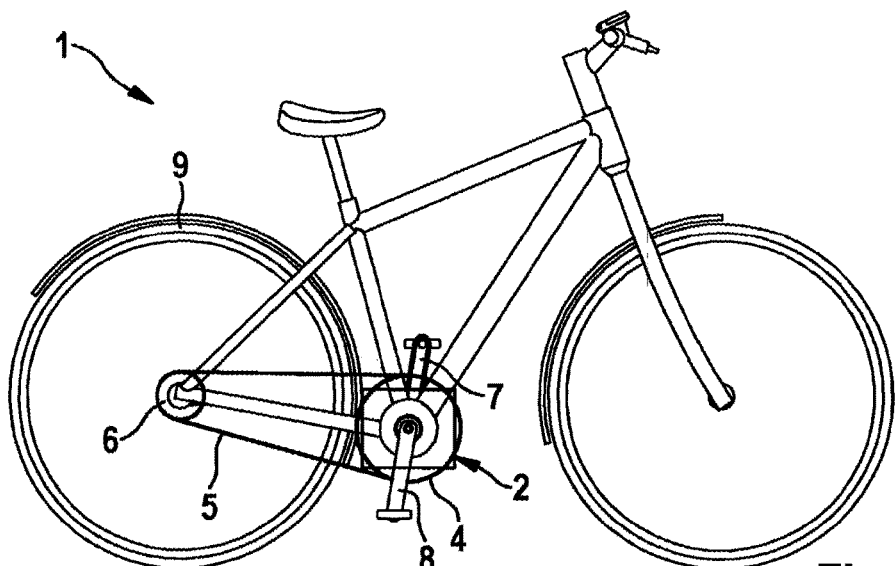
FIG. 1 shows a schematic view of a component of an electric bicycle in accordance with a first exemplary embodiment of the present invention.

As is readily apparent from FIG. 1, electric bicycle 1 includes a crankshaft drive 2 within which an electric drive 3 (see FIG. 2) is integrated. A front sprocket 4 transmits a tractive force via a chain 5 to a pinion 6 configured on a rear wheel 9. Reference numerals 7 and 8 denote crank arms having pedals of the electric bicycle.

Figure 2:
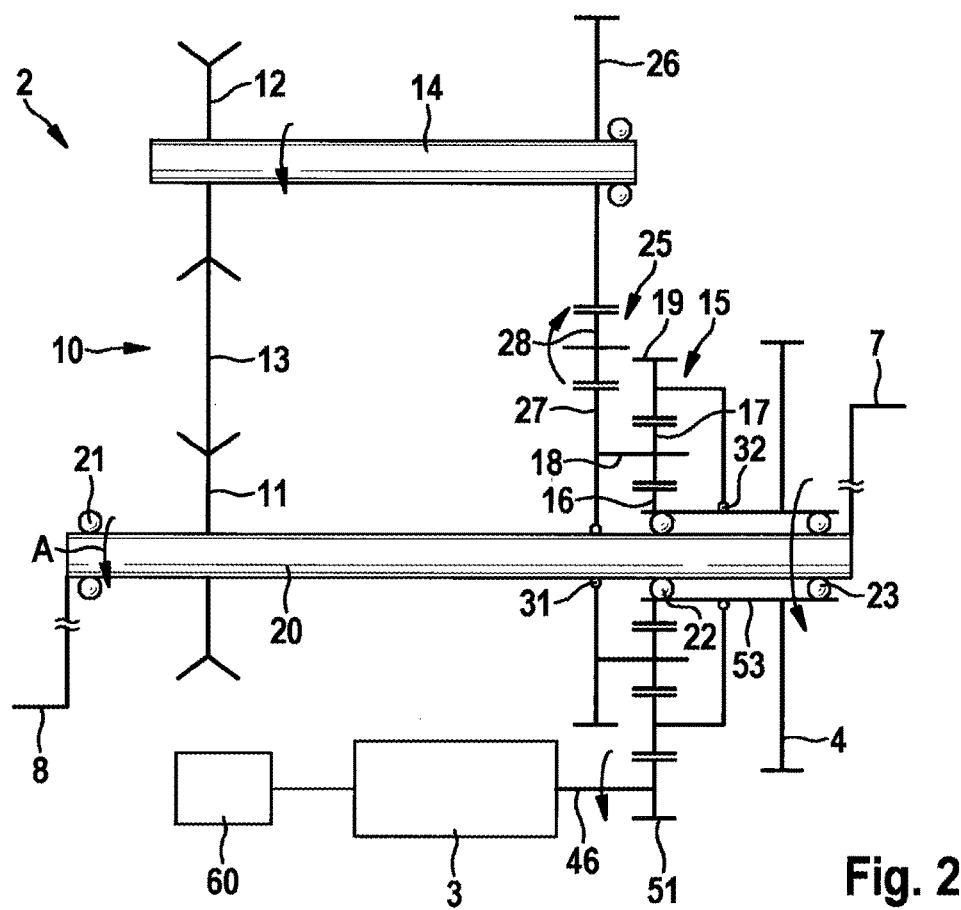
FIG. 2 shows a schematic view of a crankshaft drive of an electric bicycle in accordance with the first exemplary embodiment of the present invention.

FIG. 2 shows crankshaft drive 2 in detail. Besides the two crank arms 7, 8, crankshaft drive 2 includes a bottom bracket bearing shaft 20 that is supported on a first bottom bracket bearing 21, a second bottom bracket bearing 22, and a third bottom bracket bearing 23. A rider-applied pedal force is transmitted by the pedals to bottom bracket bearing shaft 20. Arrow A indicates a rotation of the bottom bracket bearing shaft.

Also configured on bottom bracket bearing shaft 20 is an input V-pulley 11 of a CVT transmission 10. In addition, CVT transmission 10 includes an output V-pulley 12, as well as a traction mechanism 13, for example, a belt that joins the two V-pulleys. Output V-pulley 12 is secured to an intermediate shaft 14 on which a first gear wheel 26 of a first gear stage 25 is also configured.

In addition, first gear stage 25 includes a second gear wheel 27, as well as an intermediate gearwheel 28 for reversing the direction of rotation within first gear stage 25.

As is also readily apparent from FIG. 2, second gear wheel 27 is coupled to a planetary-gear carrier 18 of a planetary gear 15. Planetary gear 15 also includes a sun gear 16, planetary gear wheels 17, as well as a ring gear 19.

Sun gear 16 is configured on a bushing 53 upon which front sprocket 4 is also mounted (compare FIG. 2). Bushing 53 is mounted via second and third bottom bracket bearing 22, 23 on bottom bracket bearing shaft 20.

Ring gear 19 of planetary gear 15 also features an external toothing that meshes with a motor pinion 51 of electric drive 3. Motor pinion 51 is mounted on a motor output shaft 46. A control unit 60 controls electric drive 3.

Second gear wheel 27 of first gear stage 25 is mounted by a first bearing 31 on bottom bracket bearing shaft 20. In addition, ring gear 19 of planetary gear 15 is mounted by a second bearing 32 on the bottom bracket bearing shaft.

CVT transmission 10 may be shifted by the rider via an actuator (not shown). Thus, the electric bicycle may do without a gearshift control at the hub of rear wheel 9.

Overall, therefore, a pedal force of a rider is transmitted via bracket bearing shaft 20 and CVT transmission 10 into planetary gear 15. If a propulsion by electric drive 3 is additionally or exclusively desired, then this torque of electric drive 3 is likewise transmitted into planetary gear 15 and, from there, acts via sun gear 16 and bushing 53 on front sprocket 4.

Thus, the friction gear configured as CVT transmission 10 assumes the function of a gearshift device of the bicycle. In this case, a transmission ratio of CVT transmission 10 may be varied continuously. The drive unit according to the present invention having a gear on the crankshaft drive may thereby be very compact and of small construction. Motor output shaft 46 extends parallel to bottom bracket bearing shaft 20 and also parallel to intermediate shaft 14 at the output of CVT transmission 10.

Thus, the present invention provides that both a gearshift device, as well as an electric drive 3 be configurable on crankshaft drive 2. Electric drive 3 and the gearshift device configured as CVT transmission 10 are preferably configured in a shared housing of crankshaft drive 2. As is readily apparent from FIG. 2, intermediate shaft 14 is located above bottom bracket bearing shaft 20, and electric drive 3 is located below bottom bracket bearing shaft 20. CVT transmission 10 may thereby render possible a continuously variable transmission of a rider-applied torque. This makes possible an especially effective interplay of the rider-applied torque and of the torque provided by electric drive 3. In particular, CVT transmission 10 also allows the transmission to be varied under load, so that, even if a transmission ratio changes, electric drive 3 may be continuously driven, as needed, and generate additional torque for a propulsion.

Figure 3:
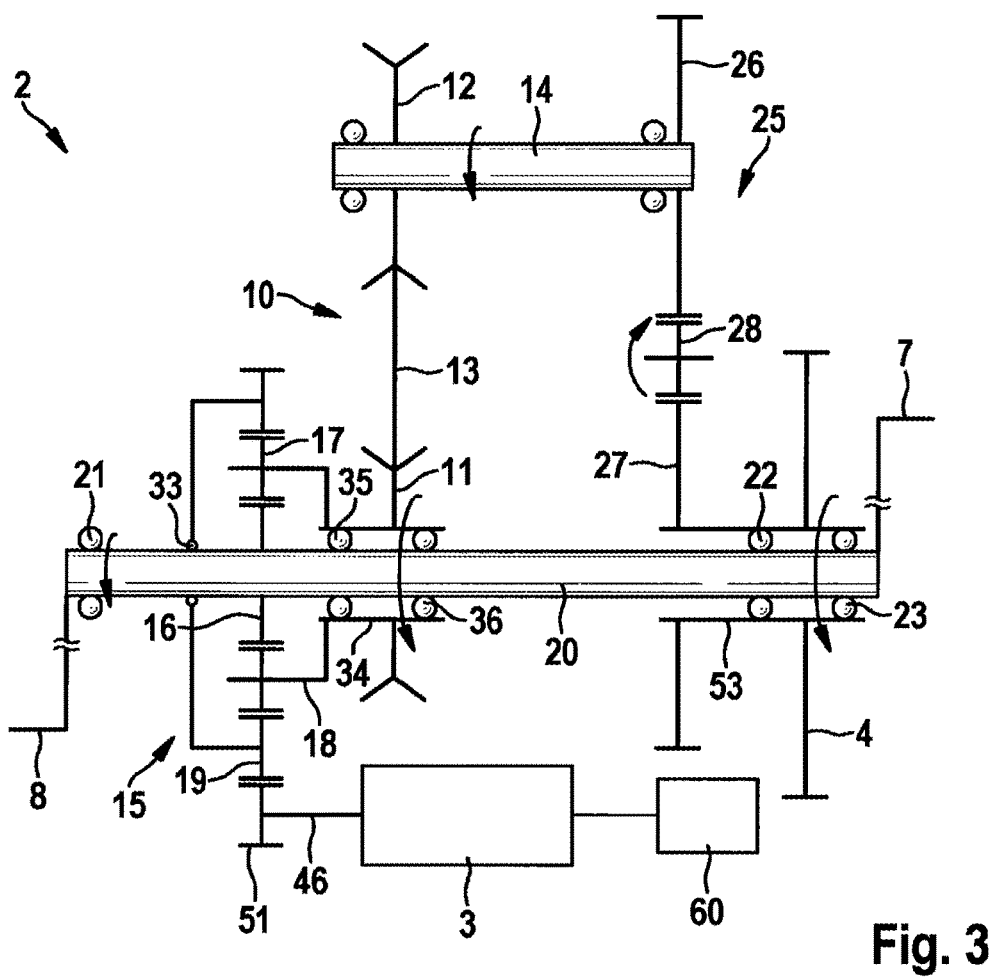
FIG. 3 shows a schematic view of a crankshaft drive of an electric bicycle in accordance with a second exemplary embodiment of the present invention.

FIG. 3 shows a crankshaft drive in accordance with a second exemplary embodiment of the present invention, where, in contrast to the first exemplary embodiment, in addition to the torque applied by the rider by pedaling, the output torque of electric drive 3 is also input into CVT transmission 10. In this case, a planetary gear 15 is configured between bottom bracket bearing shaft 20 and CVT transmission 10, as well as between electric drive 3 and CVT transmission 10. Sun gear 16 of planetary gear 15 is thereby fixedly mounted on bottom bracket bearing shaft 20 and thus receives the torque produced by pedaling. Electric drive 3 transmits a torque via a motor output shaft 46 and a motor pinion 51 to a ring gear 19 of planetary gear 15. Ring gear 19 features an external toothing here that meshes with motor pinion 51. Planetary gear 15 is output via a planetary-gear carrier 18 that is coupled to a hollow shaft 34. Hollow shaft 34 is supported via a fourth and fifth bottom bracket bearing 35, 36 on bottom bracket bearing shaft 20 and is fixedly coupled to input V-pulley 11 of CVT transmission 10 (compare FIG. 3).

Connected downstream of CVT transmission 10, in turn, is a first gear stage 25 having a first gear wheel 26, a second gear wheel 27, and an intermediate gear wheel 28 for reversing a direction of rotation. Second gear wheel 27 is configured directly on bushing 53 upon which front sprocket 4 is mounted.

The second exemplary embodiment thereby has the advantage that transmission of both the torque applied by the rider by pedaling, as well as of the torque applied by electric drive 3 may be carried out via CVT transmission 10 in the desired manner. Electric drive 3 may be controlled to preferably always be operated within the optimal speed range, and an optimal transmission is then carried out via CVT transmission 10 as a function of a torque applied by the rider by pedaling.

Figure 4:
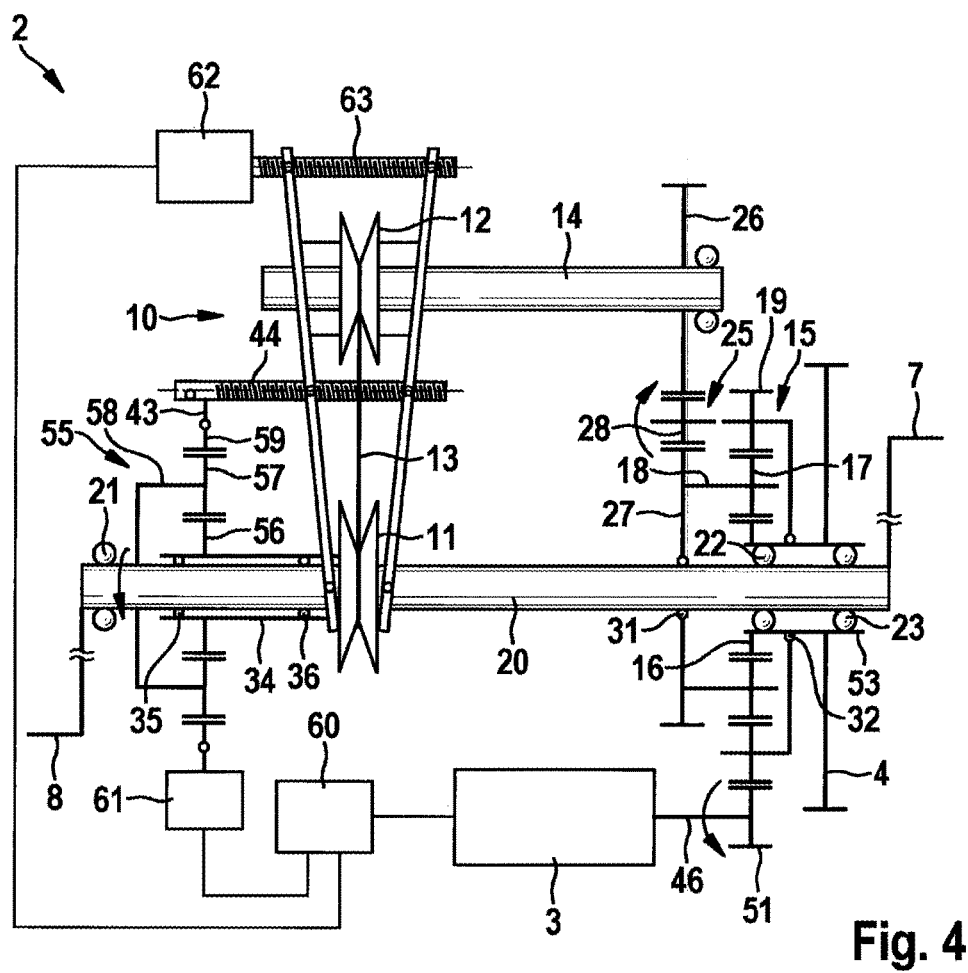
FIG. 4 shows a schematic view of a crankshaft drive of an electric bicycle in accordance with a third exemplary embodiment of the present invention.
Figure 5:
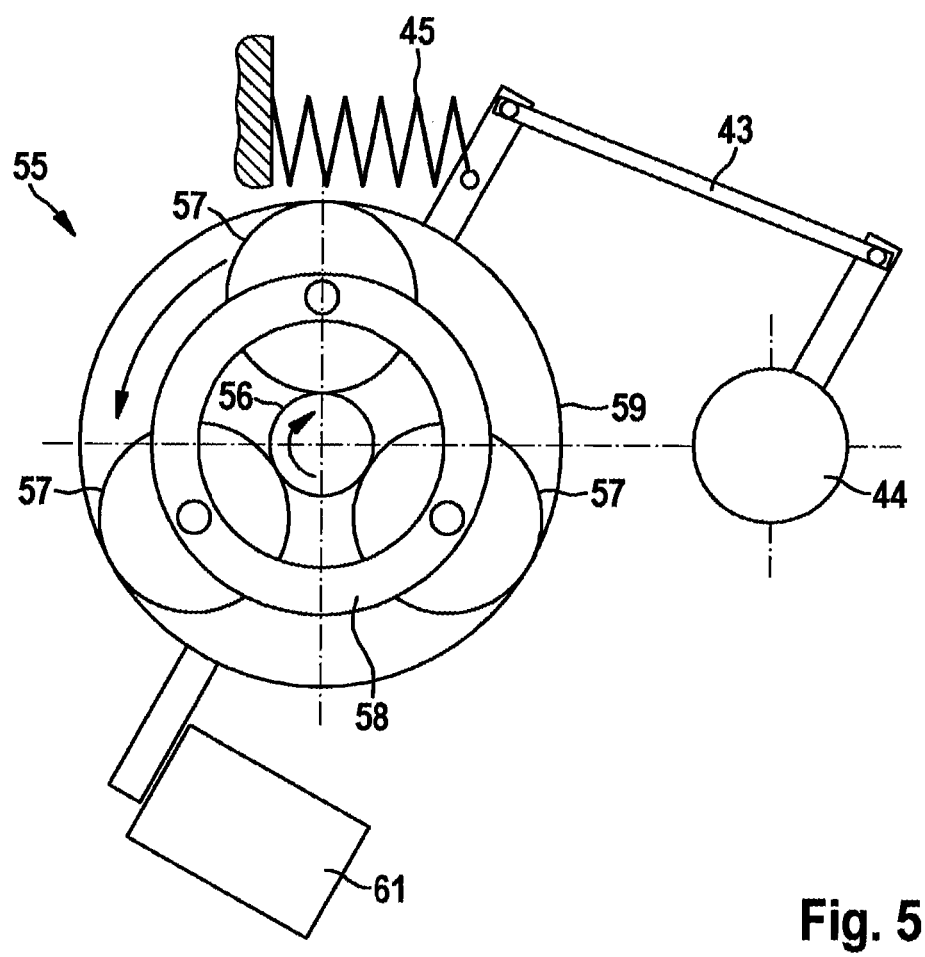
FIG. 5 shows a schematic partial view of the crankshaft drive of FIG. 4.

FIGS. 4 and 5 show a crankshaft drive 2 in accordance with a third exemplary embodiment of the present invention. As in the case of the first exemplary embodiment, in the third exemplary embodiment, only one rider-applied torque may be varied via CVT transmission 10. Electric drive 3 transmits the torque thereof into a first planetary gear 15, as in the first exemplary embodiment. In addition, in the third exemplary embodiment, a second planetary gear 55 having a sun gear 56, planetary gear wheels 57, a planetary-gear carrier 58 and a ring gear 59 are also provided. Ring gear 59 is fixed. A torque applied by the rider by pedaling is introduced via planetary-gear carrier 58 that is coupled to bottom bracket bearing shaft 20 into second planetary gear 55. An output from second planetary gear 55 via sun gear 56 drives a hollow shaft 34. Hollow shaft 34 is supported on bottom bracket bearing shaft 20 via a fourth and fifth bottom bracket bearing 35, 36. Hollow shaft 34 is directly coupled to input V-pulley 11 of CVT transmission 10.

Also configured on fixed ring gear 59 of second planetary gear 55 is a tension rod 43 that is coupled to a tensioning spindle 44 for pretensioning CVT transmission 10. Tension rod 43 is pretensioned by a spring 45 (compare FIG. 5).

In addition, a force sensor 61, which is adapted for determining the pedal force applied by the rider, is configured on fixed ring gear 59. Force sensor 61 is connected to control unit 60. A control motor 62 and an adjustment spindle 63 are provided to adjust the transmission ratio of CVT transmission 10. In particular, a spacing of output V-pulley 12 of CVT transmission 10 is varied by adjustment spindle 63.

When a rider pedals via crank arms 7, 8, a torque is exerted on fixed ring gear 59 of second planetary gear 55 and is transmitted to tension rod 43. If the rider pedals more vigorously during operation, thereby increasing the torque, a tensioning spindle 44 is rotated at a higher rate. At the same time, at the opposite side of tensioning spindle 44, force sensor 61 on ring gear 59 measures a force that corresponds to the force applied by the rider. On the basis of this force, control unit 60 determines an optimal transmission ratio of CVT transmission 10 and drives control motor 62 accordingly. Thus, in the case of the third exemplary embodiment, optimal transmission ratio may be ensured on CVT transmission 10 by a simple and compact pedal-force measurement.

What is claimed is:

1. A vehicle that is operable by at least one of motor power and muscular power, comprising:
    a crankshaft drive having a bottom bracket bearing shaft;
    a front sprocket that transmits a drive torque for the vehicle to a chain;
    an electric drive; and
    a friction gear for continuously varying a transmission ratio, wherein:
        the friction gear and the electric drive are configured on the crankshaft drive, and
        the friction gear is coupled to the crankshaft drive and adapted for transmitting a rider-produced torque to the front sprocket;
    a first planetary gear via which the electric drive drives the front sprocket;
    a second planetary gear configured between the bottom bracket bearing shaft and the friction gear, wherein the second planetary gear includes a sun gear, planetary gear wheels, a planetary gear carrier and a fixed ring gear;
    a control unit; and
    a force sensor on the fixed ring gear and connected to the control unit to record a rider-applied force, wherein the control unit controls the electric drive based on the recorded force value of the force sensor;
    wherein a first gear stage includes a second gear wheel and an intermediate gear wheel for reversing a direction of rotation within the first gear stage.

2. The vehicle as recited in claim 1, wherein the vehicle is an electric bicycle.

3. The vehicle as recited in claim 1, wherein the friction gear is configured within a housing of the crankshaft drive.

4. The vehicle as recited in claim 1, wherein the friction gear is a continuously variable transmission (CVT) transmission having an input V-pulley, an output V-pulley, and a traction mechanism.

5. The vehicle as recited in claim 4, wherein the bottom bracket bearing shaft is supported on a first bottom bracket bearing, a second bottom bracket bearing, and a third bottom bracket bearing, and wherein the traction mechanism includes a belt to join the input V-pulley and the output V-pulley, and wherein the input V-pulley is configured on the bottom bracket bearing shaft.

6. The vehicle as recited in claim 1, wherein the electric drive drives the front sprocket via the friction gear.

7. The vehicle as recited in claim 1, wherein the friction gear is coupled via the second planetary gear to the front sprocket.

8. The vehicle as recited in claim 1, wherein the bottom bracket bearing shaft extends through a component of the friction gear.

9. The vehicle as recited in claim 8, wherein the component is an input V-pulley.

10. The vehicle as recited in claim 1, wherein at least one of: the friction gear is mounted above the bottom bracket bearing shaft, and the electric drive is located below the bottom bracket bearing shaft.

11. The vehicle as recited in claim 1, wherein the second gear wheel is coupled to a planetary-gear carrier of the first planetary gear, which includes a sun gear, planetary gear wheels, and another ring gear.

12. The vehicle as recited in claim 11, wherein the sun gear is configured on a bushing upon which a front sprocket is mounted, and wherein the bushing is mounted via the second and third bottom bracket bearings on the bottom bracket bearing shaft.

13. The vehicle as recited in claim 12, wherein the another ring gear of the first planetary gear includes an external toothing that meshes with a motor pinion of the electric drive, and wherein the motor pinion is mounted on a motor output shaft.

14. The vehicle as recited in claim 13, wherein the second gear wheel of the first gear stage is mounted by the first bearing on the bottom bracket bearing shaft, and wherein the another ring gear of the first planetary gear is mounted by the second bearing on the bottom bracket bearing shaft.

15. A vehicle that is operable by at least one of motor power and muscular power, comprising:
    a crankshaft drive having a bottom bracket bearing shaft;
    a front sprocket that transmits a drive torque for the vehicle to a chain;
    an electric drive; and
    a friction gear for continuously varying a transmission ratio, wherein:
        the friction gear and the electric drive are configured on the crankshaft drive, and
        the friction gear is coupled to the crankshaft drive and adapted for transmitting a rider-produced torque to the front sprocket; and
    a first planetary gear via which the electric drive drives the front sprocket;
    a second planetary gear configured between the bottom bracket bearing shaft and the friction gear, wherein the second planetary gear includes a sun gear, planetary gear wheels, a planetary gear carrier and a fixed ring gear;
    a control unit; and
    a force sensor on the fixed ring gear and connected to the control unit to record a rider-applied force, wherein the control unit controls the electric drive based on the recorded force value of the force sensor;

wherein a first gear stage includes a second gear wheel and an intermediate gear wheel for reversing a direction of rotation within the first gear stage, and wherein the friction gear is a continuously variable transmission (CVT) transmission having an input V-pulley, an output V-pulley, and a traction mechanism, and wherein the output torque of the electric drive is also input into the CVT, wherein a planetary gear is configured between the bottom bracket bearing shaft and the CVT transmission, and between the electric drive and the CVT.

16. A vehicle that is operable by at least one of motor power and muscular power, comprising:
- a crankshaft drive having a bottom bracket bearing shaft;
- a front sprocket that transmits a drive torque for the vehicle to a chain;
- an electric drive; and
- a friction gear for continuously varying a transmission ratio, wherein:
    - the friction gear and the electric drive are configured on the crankshaft drive, and
    - the friction gear is coupled to the crankshaft drive and adapted for transmitting a rider-produced torque to the front sprocket; and
- a first planetary gear via which the electric drive drives the front sprocket;
- a second planetary gear configured between the bottom bracket bearing shaft and the friction gear, wherein the second planetary gear includes a sun gear, planetary gear wheels, a fixed ring gear, and a planetary gear carrier, the planetary gear carrier being coupled to the bottom bracket bearing shaft;
- a control unit; and
- a force sensor on the fixed ring gear and connected to the control unit to record a rider-applied force, wherein the control unit controls the electric drive based on the recorded force value of the force sensor;

wherein a first gear stage includes a second gear wheel and an intermediate gear wheel for reversing a direction of rotation within the first gear stage, and wherein the friction gear is a continuously variable transmission (CVT) transmission having an input V-pulley, an output V-pulley, and a traction mechanism, wherein a torque applied by the rider by pedaling is introduced into the second planetary gear via the planetary gear carrier, wherein an output from the second planetary gear via the sun gear drives a hollow shaft, which is supported on the bottom bracket bearing shaft via fourth and fifth bottom bracket bearings, and wherein the hollow shaft is directly coupled to the input V-pulley of the CVT.

17. The vehicle as recited in claim 16, wherein a tension rod is configured on the fixed ring gear of the second planetary gear, and wherein the tension rod is coupled to a tensioning spindle for pretensioning the CVT.

18. The vehicle as recited in claim 17, wherein a control motor and an adjustment spindle are provided to adjust a transmission ratio of the CVT, and wherein a spacing of the output V-pulley of the CVT is varied by the adjustment spindle.

* * * * *